UNITED STATES PATENT OFFICE.

HENRY PETRIE FLETCHER, OF COOGEE, NEAR SYDNEY, NEW SOUTH WALES, AUSTRALIA, ASSIGNOR TO ALFRED JAMES PARKER, OF AUCKLAND, NEW ZEALAND.

PROCESS FOR THE CONVERSION OF CERTAIN WATER PASTES INTO CERTAIN OIL PASTES.

15,298. Specification of Reissued Letters Patent. Reissued Mar. 7, 1922.

No Drawing. Original No. 1,317,784, dated October 7, 1919, Serial No. 258,644, filed October 17, 1918. Application for reissue filed September 30, 1921. Serial No. 504.440½.

*To all whom it may concern:*

Be it known that I, HENRY PETRIE FLETCHER, a subject of the King of Great Britain, residing at Coogee, near Sydney, in the State of New South Wales, Australia, have invented certain new and useful Improvements in Processes for the Conversion of Certain Water Pastes into Certain Oil Pastes, of which the following is a specification.

This invention relates to improvements in the manufacture of certain oil pastes and has been devised in order that the water in a water paste, such as water pastes in which whitelead (carbonates or sulphates) is the base, may be removed therefrom and oil substituted for the said water without necessitating an intermediate drying operation and to obtain a satisfactory commercial product.

In the production of certain oil pastes such as that wherein precipitated whitelead is the base, the material under treatment assumes at one stage of manufacture the form of a wet pulp or water paste from which (according to the processes heretofore generally used) it is necessary to remove the water and to permeate the material with oil, such as linseed oil.

The salient feature of this invention resides in the provision of chemical and mechanical means whereby the pulp is permeated with oil to form an oil paste and the contained water is expelled without necessitating a distinct drying operation.

The wet pulp or water paste which is required to be converted into an oil paste is treated by the addition of a predetermined quantity of borate of manganese. The proportion of borate of manganese to wet pulp would vary within certain limits hereinafter clearly defined according to the percentage of water contained in the pulp, and the quantity of oil required to be incorporated. When treating thick pastes, that is pulp having a comparatively low water content the proportion of borate of manganese added should be small, and when there are to be treated slush pastes that is those having a comparatively high water content the proportion of borate of manganese should be relatively higher.

The preferred proportion for pulp having a water content of approximately 20% by weight is 9 grains of borate of manganese to 1 pound of wet pulp, which corresponds to approximately ⅛ of 1%.

For slush pastes the proportion may be progressively raised according to the water content to a maximum for most purposes of 25 grains to the pound of wet pulp.

Under no circumstances should the proportion of borate of manganese to wet pulp exceed ½ of 1%, otherwise the desired effect will not be attained in a satisfactory commercial manner, as an excess of borate of manganese in the pulp will saponify the oil.

To the pulp is also added the required quantity of oil and the mass is subjected to mechanical working and mixing, the water being expelled from the pulp and the oil combining therewith. About 8% of oil is a convenient and customary quantity for use. This working or mixing is continued until the paste is of the required consistency.

For the purpose of carrying out the working and mixing operation on a commercial scale any ordinary mechanical device or machine known in the art and found suitable may be employed, such as a machine of the dough-kneading and mixing type.

Instead of using borate of manganese as hereinbefore described, borax or other boracic acid salts may be employed, in which case I prefer to use slightly more than nine grains as above described.

In the example of wet pulp to be treated I have mentioned whitelead as an example, but the invention is not confined thereto.

What I do claim is:

1. The process for the conversion of water pastes in which white lead is the base into oil pastes which consists in adding to the water paste boracic acid salts and oil, and subjecting the mass to mechanical working and mixing.

2. The process for the conversion of water pastes in which white lead is the base, into oil pastes which consists in adding to the water paste borate of manganese and oil, and subjecting the mass to mechanical working and mixing.

3. The process for the conversion of water pastes in which white lead is the base into oil pastes which consists in adding to the water paste borate of manganese not exceeding one half of one per cent by weight of the paste, and the required quantity of oil, and subjecting the mass to mechanical working and mixing.

4. In a process for the conversion of water pastes in which white lead is the base into oil pastes, the subjecting of the water paste to the action of borate of manganese, said borate of manganese being added in the proportion by weight of not exceeding one half of one per cent.

5. In a process for the conversion of water pastes of white lead carrying about 20% by weight of water into oil pastes, the subjecting of the water paste to the action of borate of manganese, said borate of manganese being added in the proportion by weight of between the limits of one-eighth and one-half of one per cent.

6. The herein described process which comprises mixing a plup of white lead with a small amount of a borate, then adding oil and working the mass.

HENRY PETRIE FLETCHER.